(12) United States Patent
Critsinelis et al.

(10) Patent No.: US 11,634,970 B2
(45) Date of Patent: Apr. 25, 2023

(54) SYSTEMS AND METHODS FOR THERMAL MANAGEMENT OF SUBSEA CONDUITS USING A JUMPER HAVING ADJUSTABLE INSULATING ELEMENTS

(71) Applicant: Chevron U.S.A. Inc., San Ramon, CA (US)

(72) Inventors: Antonio C. F. Critsinelis, Kingwood, TX (US); Sid Mebarkia, Sugar Land, TX (US); Michelle A. Wise, Berkeley, CA (US); Yesudas J. Manimala, Katy, TX (US); William C. Hughes, Houston, TX (US); Steven W. Cochran, Houston, TX (US); Edgar Uribe, Houston, TX (US); Jason D. Garcia, Bellaire, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 256 days.

(21) Appl. No.: 16/774,708

(22) Filed: Jan. 28, 2020

(65) Prior Publication Data
US 2021/0230975 A1    Jul. 29, 2021

(51) Int. Cl.
*E21B 36/00* (2006.01)
*F16L 59/14* (2006.01)
*E21B 43/01* (2006.01)

(52) U.S. Cl.
CPC .......... *E21B 36/001* (2013.01); *E21B 36/003* (2013.01); *E21B 43/01* (2013.01); *F16L 59/14* (2013.01)

(58) Field of Classification Search
CPC ...... E21B 36/001; E21B 36/003; E21B 43/01; E21B 43/017; F16L 59/14; F16L 55/025; F16L 27/11; F16L 59/21
See application file for complete search history.

(56) References Cited

U.S. PATENT DOCUMENTS

| | | | |
|---|---|---|---|
| 6,278,095 | B1 | 8/2001 | Bass |
| 7,044,228 | B2 | 5/2006 | Langford et al. |
| 8,742,594 | B2 | 6/2014 | Daubenspeck et al. |
| 2003/0145997 | A1 | 8/2003 | Langford et al. |
| 2006/0016617 | A1* | 1/2006 | Corbishley ............ F16L 59/14 |
| | | | 174/137 R |
| 2006/0266523 | A1* | 11/2006 | Lower ................... E21B 36/003 |
| | | | 166/347 |
| 2010/0044053 | A1 | 2/2010 | Grimseth et al. |
| 2016/0130918 | A1 | 5/2016 | Bhatnagar et al. |

* cited by examiner

*Primary Examiner* — Blake Michener
*Assistant Examiner* — Yanick A Akaragwe
(74) *Attorney, Agent, or Firm* — Jason M Guerrero

(57) ABSTRACT

Disclosed are systems and methods for thermal management of subsea conduits such as jumpers that provide the ability to alternate between cooling and heat retention of production fluids within the conduit as needed depending on the phase of operation. Adjustable insulation elements are provided on the conduits so that convective heat transfer between surrounding seawater and the conduit can be allowed or reduced. A control system can activate an alarm indicating the need to adjust the insulation depending on the temperature and/or flow rate of fluids in the conduit. Conventional conduits can be retrofitted by adding adjustable insulation elements to enable thermal management.

20 Claims, 7 Drawing Sheets

SYSTEMS AND METHODS FOR THERMAL MANAGEMENT OF SUBSEA CONDUITS USING A JUMPER HAVING ADJUSTABLE INSULATING ELEMENTS

FIELD

This disclosure relates generally to subsea oil and gas production facilities, and particularly to flowline jumpers extending between subsea components. The disclosure further relates to thermal management of such jumpers.

BACKGROUND

The production of hydrocarbons from offshore oil and gas reservoirs requires the transportation of production fluids from the reservoirs to subsea facilities for processing. Three phases, i.e., oil, gas and water, may be included in the production fluids. Subsea developments increasingly must accommodate high temperature production fluids that need to be safely transported to the production facility. The high temperature of the production fluids can have several undesirable effects. Special grade subsea and pipeline materials, extensive qualifications of insulation coating and expensive modifications topsides may be required to handle the high temperature of the product. For instance, water cooled heat exchangers may be used topsides on an offshore platform to reduce the temperature of production fluids, e.g., from around 400° F. to a temperature below 250° F., involving weight, space, cost, etc. In the subsea facility, the high temperature of the product may undesirably result in the occurrence of upheaval buckling, lateral buckling and pipeline walking in flowlines carrying the product. The temperature may also undesirably accelerate corrosion and therefore reduce the life of the flowlines. Attempts have been made at providing a subsea cooling system for use with gas production. No established oil or three phase subsea cooling system is available in the industry.

There exists a need for cost-effective subsea cooling systems and methods that can be applied to subsea flowlines or jumpers that carry three-phase production fluids to enable the development of high temperature subsea fields without the disadvantages of known systems.

SUMMARY

In general, in one aspect, the disclosure relates to a system for thermal management of a subsea conduit that carries oil and/or gas produced from a subsea well in a subsea production facility located on a seabed. The system includes a conduit for carrying production fluids having two ends for connecting to subsea components, and at least one adjustable insulation element surrounding the conduit that can be adjusted between at least a first position in which the conduit is relatively less insulated with respect to seawater surrounding the conduit and a second position in which the conduit is relatively more insulated with respect to seawater surrounding the conduit.

In another aspect, the disclosure can generally relate to a method for thermal management of the subsea conduit in the subsea production facility. The method includes providing the at least one adjustable insulation element surrounding the conduit, transmitting oil and/or gas produced from the subsea well through the conduit; and adjusting the at least one adjustable insulation element between at least the first position and the second position, such that heat transfer between the conduit and the seawater is controlled.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1:
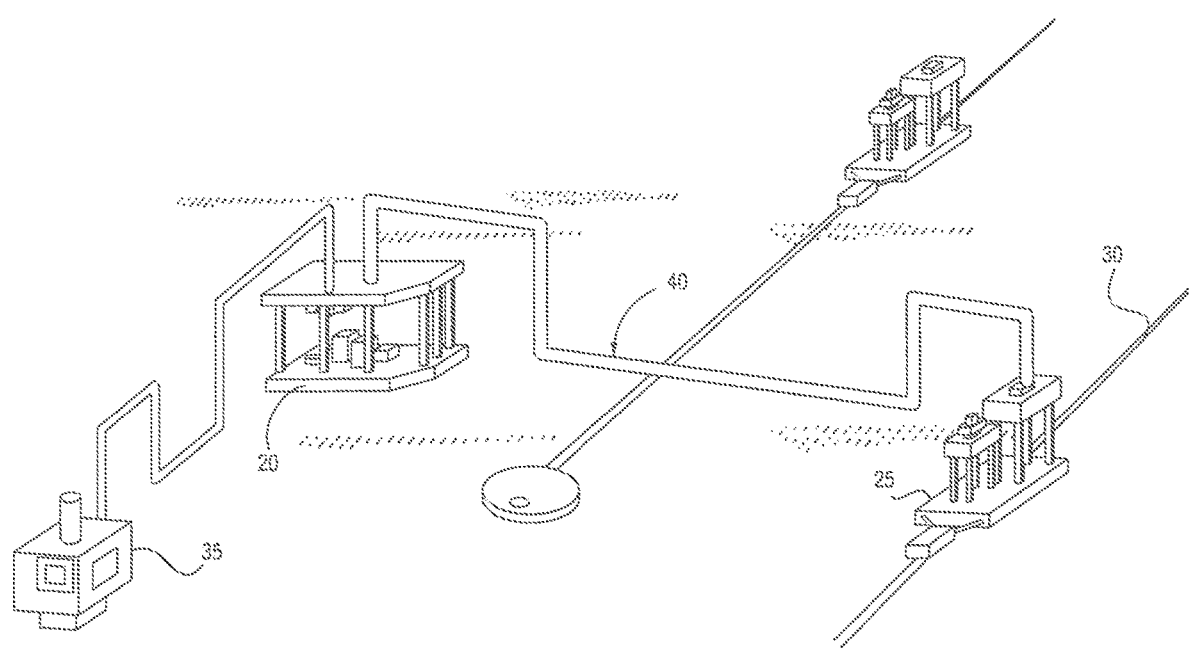
FIG. 1 shows an example embodiment of a subsea jumper according to the prior art.

Referring to FIG. 1, a prior art subsea production facility is shown. A subsea pipeline 30 carries oil and/or gas produced from a subsea well 35 in the facility located on the seabed. A jumper 40 is connected to a first subsea component 20 (in this illustration, a manifold) and a second subsea component 25 (in this illustration, a pipeline end termination (PLET)). The subsea jumper 40 connects two different structures such as manifold and PLET to allow product flow to or from a subsea pipeline 30. The subsea pipeline 30 is connected to the pipeline end termination. The subsea jumper 40 typically consists of interconnected pipes, connectors, bends and insulation coating. The insulation (not shown) can ensure the product remains flowing above a certain temperature to avoid formation of waxes or hydrates that risk plugging the jumper pipe and stopping production. During shut down when production is stopped, the insulation is used to allow a minimum safe cool down time typically in the range of 12 to 16 hours to avoid formation of waxes of hydrates. As shown, the jumper 40 is shaped with a general M-shape to allow for safe thermal expansion as the temperature of the produced fluids increase through the jumper 40. This helps prevent thermal fatigue of the jumper 40.

Systems and methods are described herein for thermal management of subsea conduit for carrying oil and/or gas produced from a subsea well in a subsea production facility in ways not possible using prior art methods. The subsea conduit (also referred to as the conduit or the jumper) can be, but is not limited to, a spool, a jumper or a pipe. The conduit has two ends for connecting to subsea components, such as but not limited to wellheads, manifolds, pipeline end terminations (PLETs), and the like. In various embodiments, the conduit is self-draining and can have variable insulation to manage operation when cooling is needed as well as shutdown or late stage when heat retention is needed. The system advantageously provides the ability to adjust between cooling mode during normal operation and heat retention mode during shut down or late life operation.

Figure 2:
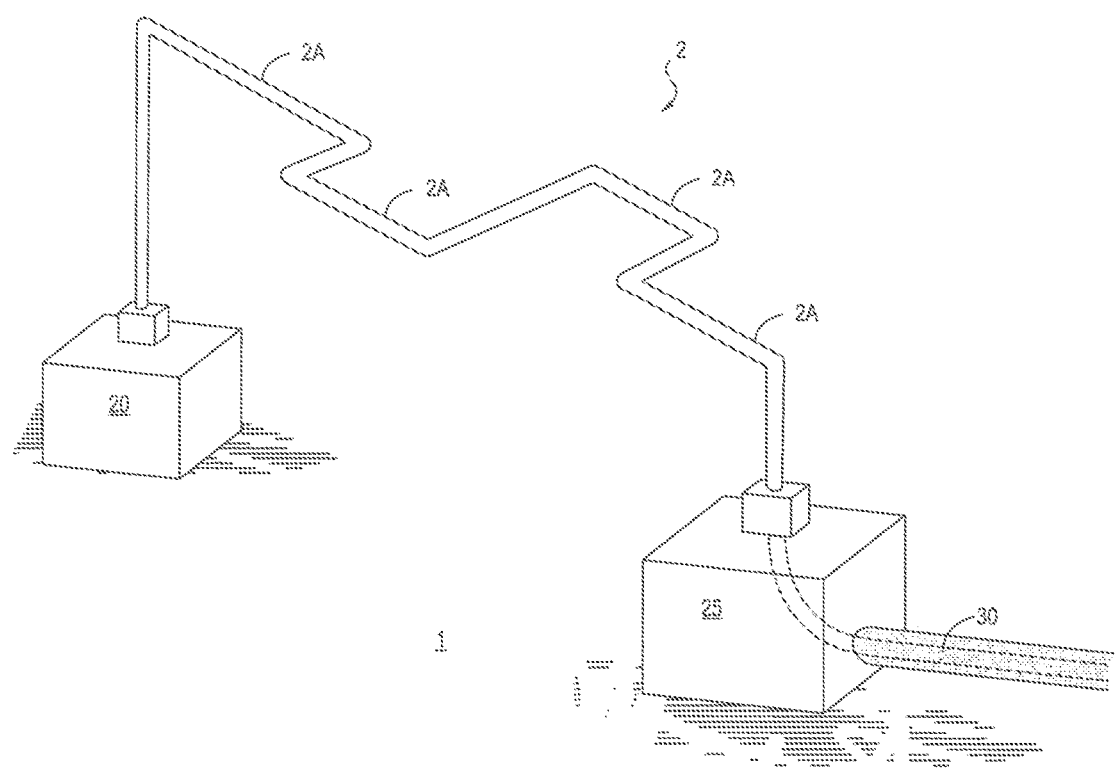
FIG. 2 shows another example embodiment of a self-draining jumper.

In one embodiment, the conduit includes conduit segments changing in direction, e.g., zig-zagging, and sloping downward such that flow of fluid in the conduit is assisted by gravity thereby ensuring self-draining of the fluid independent from fluid pressure in the conduit. An example of such a configuration is shown in FIG. 2 where conduit segments 2A in the conduit 2 change direction and slope downward such that flow of fluid in the conduit 2 is assisted by gravity thereby ensuring self-draining of the fluid independent from fluid pressure in the conduit 2. In one embodiment, the conduit 2 is positioned at an angle greater than 0 degrees and less than 90 degrees such that the conduit 2 is sloping with respect to the seabed.

Figure 3:
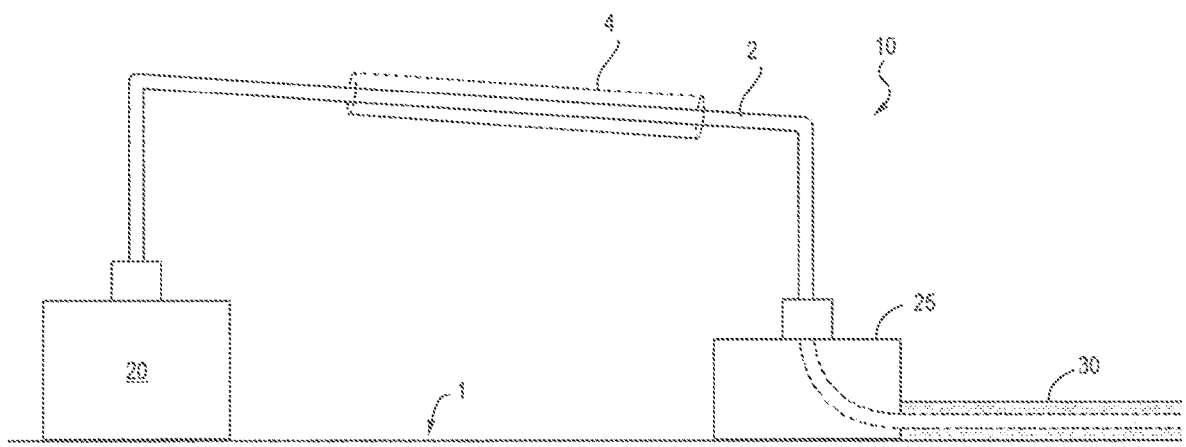
FIG. 3 shows an example embodiment of adjustable insulation for a subsea jumper.

In one embodiment, referring to FIG. 3, a simplified system is shown for thermal management of a subsea conduit 2 for carrying oil and/or gas produced from a subsea well in a subsea production facility located on a seabed 1 in which the conduit 2 has two ends for connecting to subsea components (components not shown). The conduit 2 is at least partially surrounded by at least one adjustable insulation element 4 surrounding the conduit 2 that can be adjusted between at least a first position in which the conduit is relatively less insulated with respect to seawater surrounding the conduit (enabling cooling mode) and a second position in which the conduit is relatively more insulated with respect to seawater surrounding the conduit (enabling heat retention mode).

Figure 4A:
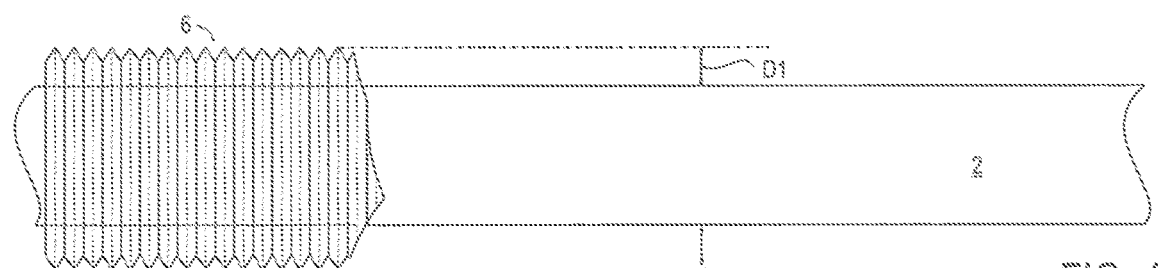
FIGS. 4A-4C show another example embodiment of adjustable insulation for a subsea jumper.
Figure 4B:
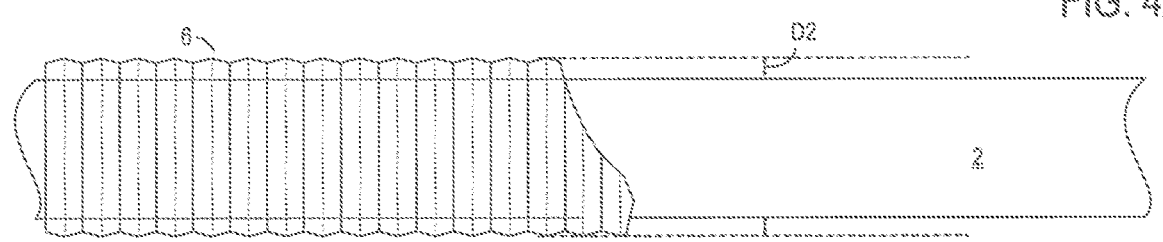
Figure 4C:
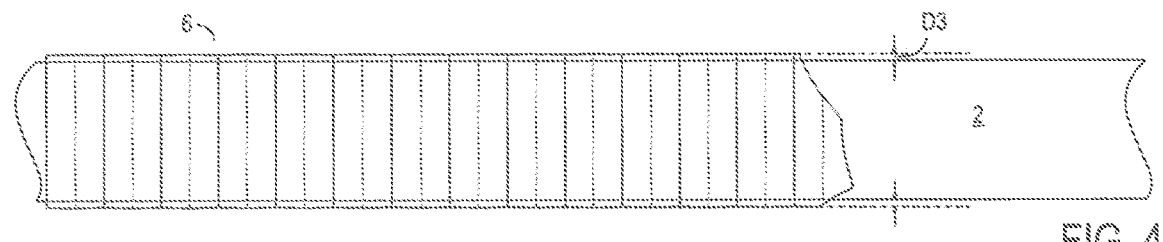

In one embodiment, referring to FIG. 4, the adjustable insulation elements 4 are bellows elements 6 positioned concentrically around the conduit 2. The bellows elements 6 are adjustable between a retracted position and an elongated position (see FIGS. 4A-4C). In the retracted position, the bellows element 6 is retracted in length to expose more of the conduit 2 to surrounding seawater, thus enabling the cooling mode by allowing convective heat transfer between the seawater and the conduit 2. In the elongated position, the bellows element 6 is elongated in length to cover the conduit 2, thus enabling the heat retention mode by reducing convective heat transfer between the seawater and the conduit 2. In one embodiment, the bellows element 6 is moved between the retracted and elongated positions by a hydraulic track and/or pulley system (not shown) along the length of the conduit 2. In one embodiment, a handle can be provided on the bellows element 6 for moving the bellows element 6 between the retracted and elongated positions by a remotely operated vehicle (ROV).

Figure 5A:
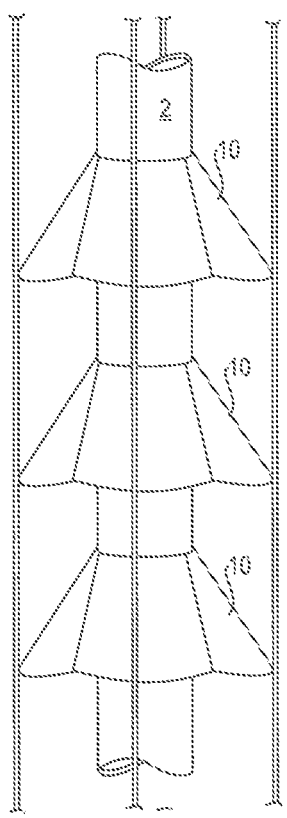
FIGS. 5A-5C are views of another example embodiment of adjustable insulation for a subsea jumper.
Figure 5B:
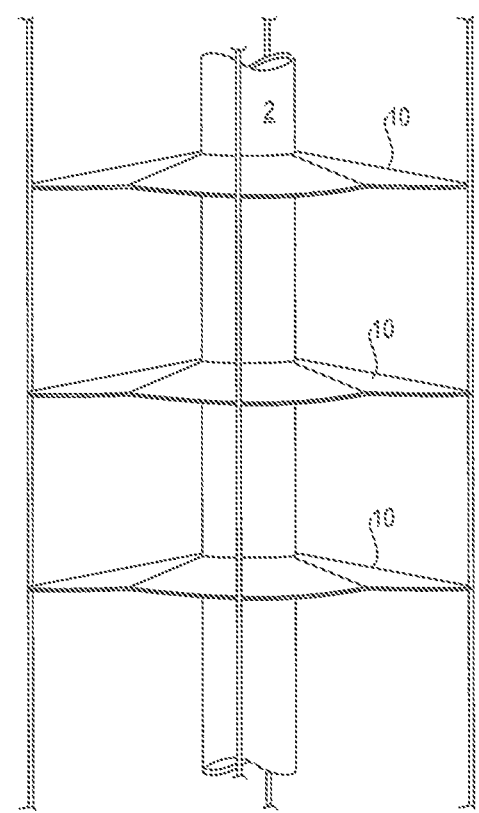
Figure 5C:
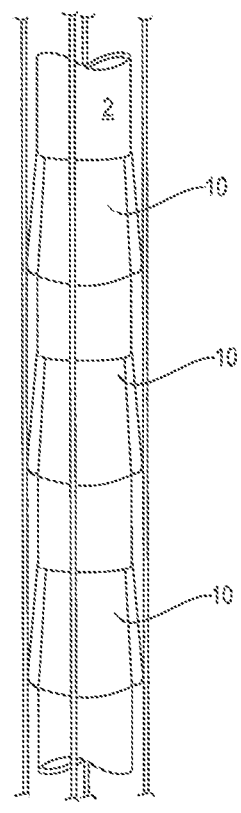

In one embodiment, referring to FIGS. 5A-5C, the adjustable insulation elements 4 are folding radially extendable shutter elements 10 that are adjustable between an open and a closed position. In the open position, shown in FIG. 5B, the folding radially extendable shutter elements 10 are generally perpendicular to the axis of the conduit 2, thus enabling the cooling mode by allowing convective heat transfer between the seawater and the conduit 2. In the closed position, shown in FIG. 5C, the folding radially extendable shutter elements 10 are generally parallel to the conduit's axis, thus enabling the heat retention mode by reducing convective heat transfer between the seawater and the conduit 2. Multiple folding radially extendable shutter elements can are provided along the length of the conduit 2.

All of the folding radially extendable shutter elements 10 can be opened or closed simultaneously by way of hydraulics or ROV operation.

Figure 6A:
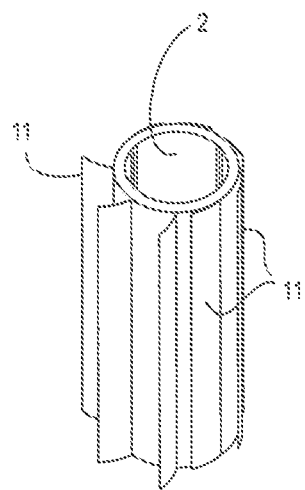
FIGS. 6A-6C are views of another example embodiment of adjustable insulation for a subsea jumper.
Figure 6B:
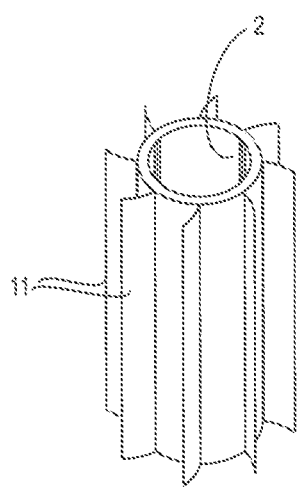
Figure 6C:
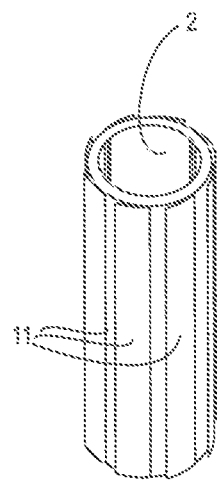

In one embodiment, referring to FIGS. 6A-6C, the adjustable insulation elements are hinged shutter elements 11 that are elongated circumferentially with respect to the conduit 2. Each hinged shutter element 11 has an elongated panel and an elongated hinge and is adjustable between an open position (shown in FIG. 6B) in which each hinged shutter element is positioned away from the conduit 2 and a closed position (shown in FIG. 6C) in which each hinged shutter element 11 is positioned directly over the conduit 2. Multiple hinged shutter elements 11 are provided around the circumference of the conduit 2 such that when the hinged shutter elements are all in the open position, the conduit 2 is exposed to surrounding seawater thereby enabling cooling mode by allowing convective heat transfer between the seawater and the conduit 2. Likewise, when the hinged shutter elements 11 are all in the closed position, the conduit 2 is protected from the surrounding seawater thereby enabling heat retention mode by reducing convective heat transfer between the seawater and the conduit 2.

Figure 7:
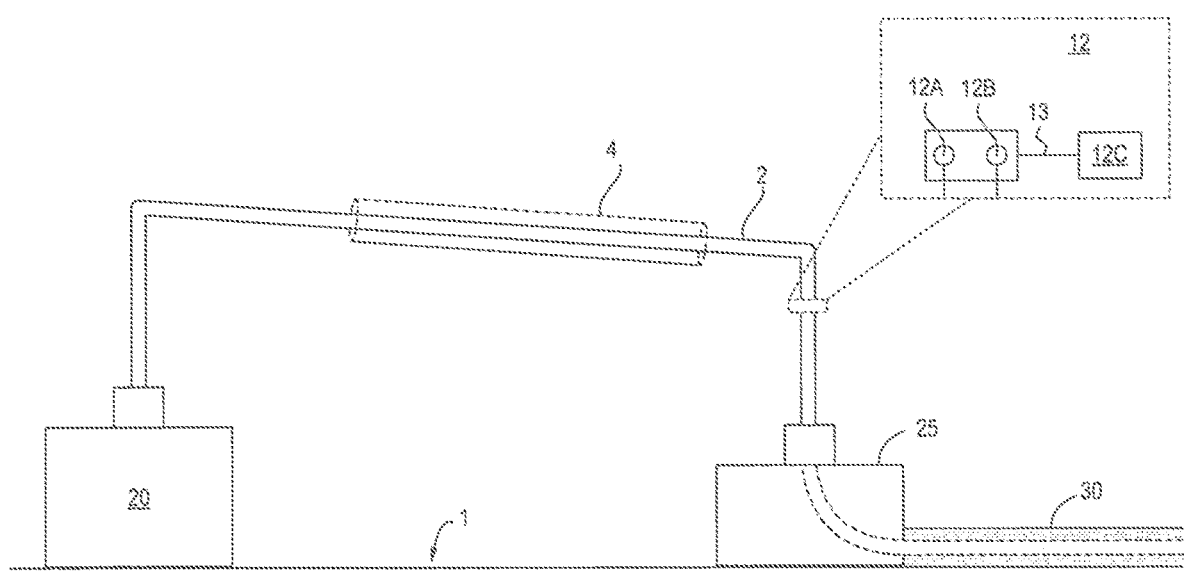
FIG. 7 shows an example embodiment of adjustable insulation for a subsea jumper with a control system.

In some embodiments, as shown in FIG. 7, a control system 12 is utilized for monitoring temperature and/or flow rate of fluid in the conduit 2 and using the temperature and/or flow rate information to activate an alarm indicating the need to adjust the adjustable insulation element(s) 4 to switch between cooling mode and heat retention mode. The control system can include a temperature sensor 12A for continuously monitoring the internal fluid temperature of the fluid in the conduit 2 and/or a flow rate sensor 12B for continuously monitoring an internal fluid flow velocity of the fluid in the conduit 2, and a flying lead or umbilical 13 for transmitting temperature and/or flow rate data to a processor 12C. In one embodiment, the temperature sensor 12A can be a phase change thermostat. The processor 12C is programmed or set to automatically determine whether to activate the alarm and activate the alarm when the position of the adjustable insulation element 4 needs to be adjusted based on a predetermined fluid temperature and/or flow rate. Operating personnel can then act on the alarm to make the needed adjustment. The adjustment can be made manually using an ROV. The adjustment can be made remotely from a surface location. In one embodiment, the control system 12 can be configured such that the position of the adjustable insulation element(s) 4 can be adjusted automatically.

Conventional subsea conduits such as jumpers can be retrofitted to provide thermal management by installing any of the adjustable insulation elements as described herein.

It should be noted that only the components relevant to the disclosure are shown in the figures, and that many other components normally part of a subsea oil and gas facility are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. A system for thermal management of a subsea conduit that carries oil and/or gas produced from a subsea well in a subsea production facility located on a seabed, comprising:
   a conduit for carrying production fluids having two ends for connecting to subsea components; and
   at least one adjustable insulation element surrounding the conduit that is adjustable between at least a first position wherein the conduit is relatively less insulated with respect to seawater surrounding the conduit and a second position wherein the conduit is relatively more insulated with respect to seawater surrounding the conduit, and wherein each of the at least one adjustable insulation element is a bellows element positioned concentric with and surrounding the conduit and adjustable between the first position wherein the bellows element is retracted in length thereby exposing more of the conduit to surrounding seawater and providing convective heat transfer between the seawater and the conduit and the second position wherein the bellows element is elongated in length thereby reducing convective heat transfer between the seawater and the conduit.

2. The system of claim 1 wherein the system further comprises a hydraulic track and/or pulley system along the length of the conduit for moving the bellows element between the first and second positions.

3. The system of claim 1 wherein the system further comprises a handle on the bellows element for moving the bellows element between the first and second positions by a remotely operated vehicle (ROV).

4. The system of claim 1 wherein the conduit is a spool, a jumper or a pipe.

5. The system of claim 1 further comprising a control system comprising a temperature sensor for continuously monitoring an internal fluid temperature of a fluid in the conduit and/or a flow rate sensor for continuously monitoring an internal fluid flow velocity of a fluid in the conduit and a flying lead or umbilical for transmitting temperature and/or flow rate data to a processor; wherein the control system is capable of being set to automatically activate an alarm indicating a need to adjust a position of the at least one adjustable insulation element based on a predetermined fluid temperature and/or flow rate.

6. The system of claim 5 wherein the temperature sensor comprises a phase change thermostat for continuously monitoring the internal fluid temperature of the fluid in the conduit.

7. The system of claim 5 wherein the position of the at least one adjustable insulation element is adjusted responsive to the alarm automatically.

8. The system of claim 5 wherein the position of the at least one adjustable insulation element is adjusted responsive to the alarm manually using an ROV.

9. The system of claim 5 wherein the position of the at least one adjustable insulation element is adjusted responsive to the alarm remotely from a surface location.

10. The system of claim 1 wherein the conduit includes conduit segments changing in direction such that flow of fluid in the conduit is assisted by gravity in a downward direction thereby ensuring self-draining of the fluid independent from fluid pressure in the conduit.

11. The system of claim 1 wherein the conduit is positioned at an angle greater than 0 degrees and less than 90 degrees such that the conduit is sloping with respect to the seabed.

12. A method for thermal management of a subsea conduit that carries oil and/or gas produced from a subsea well in a subsea production facility located on a seabed, comprising:
   providing at least one adjustable insulation element surrounding a conduit for carrying production fluids having two ends for connecting to subsea components;
   transmitting oil and/or gas produced from the subsea well through the conduit; and
   adjusting the at least one adjustable insulation element between at least a first position wherein the conduit is relatively less insulated with respect to seawater surrounding the conduit and a second position wherein the conduit is relatively more insulated with respect to the seawater such that heat transfer between the conduit and the seawater is controlled, wherein each of the at least one adjustable insulation element is a bellows element positioned concentric with and surrounding the conduit and adjustable between the first position wherein the bellows element is retracted in length thereby exposing more of the conduit to surrounding seawater and providing convective heat transfer between the seawater and the conduit and the second position wherein the bellows element is elongated in length thereby reducing convective heat transfer between the seawater and the conduit.

13. The method of claim 12 wherein the bellows element is moved between the first and second positions using a hydraulic track and/or pulley system along the length of the conduit.

14. The method of claim 12 wherein the bellows element is moved between the first and second positions by an ROV using a handle on the bellows element.

15. The method of claim 12 further comprising monitoring an internal fluid temperature of a fluid in the conduit and/or monitoring an internal fluid flow velocity of a fluid in the conduit and transmitting temperature and/or flow rate data to a processor of a control system set to automatically activate an alarm indicating a need to adjust a position of the at least one adjustable insulation element based on a predetermined fluid temperature and/or flow rate.

16. The method of claim 15 wherein the position of the at least one adjustable insulation element is adjusted responsive to the alarm automatically.

17. The method of claim 15 wherein the position of the at least one adjustable insulation element is adjusted responsive to the alarm manually using an ROV.

18. The method of claim 15 wherein the position of the at least one adjustable insulation element is adjusted responsive to the alarm remotely from a surface location.

19. The method of claim 12 wherein the conduit includes conduit segments changing in direction such that flow of fluid in the conduit is assisted by gravity in a downward direction thereby ensuring self-draining of the fluid independent from fluid pressure in the conduit.

20. The method of claim 12 wherein the conduit is positioned at an angle greater than 0 degrees and less than 90 degrees such that the conduit is sloping with respect to the seabed.

* * * * *